(12) United States Patent
Kuromatsu et al.

(10) Patent No.: US 9,413,931 B2
(45) Date of Patent: Aug. 9, 2016

(54) INFORMATION PROCESSING APPARATUS AND COMPUTER-READABLE STORAGE MEDIUM

(71) Applicant: CASIO COMPUTER CO., LTD., Shibuya-ku, Tokyo (JP)

(72) Inventors: Tetsuya Kuromatsu, Ome (JP); Keiichi Tanioka, Ome (JP); Yasuaki Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/410,484

(22) PCT Filed: Jun. 6, 2013

(86) PCT No.: PCT/JP2013/066289
§ 371 (c)(1),
(2) Date: Dec. 22, 2014

(87) PCT Pub. No.: WO2013/191068
PCT Pub. Date: Dec. 27, 2013

(65) Prior Publication Data
US 2015/0326758 A1    Nov. 12, 2015

(30) Foreign Application Priority Data

Jun. 22, 2012  (JP) ................................. 2012-141036

(51) Int. Cl.
*H04N 5/225* (2006.01)
*G06T 5/50* (2006.01)
(Continued)

(52) U.S. Cl.
CPC ............ *H04N 5/2252* (2013.01); *G06F 1/1616* (2013.01); *G06F 1/1643* (2013.01);
(Continued)

(58) Field of Classification Search
CPC .. H04N 5/2252; H04N 5/23229; G06T 5/006; G06T 5/50
See application file for complete search history.

(56) References Cited

U.S. PATENT DOCUMENTS

| | | | |
|---|---|---|---|
| 2008/0151099 A1* | 6/2008 | Lin | G06F 1/1616 348/376 |
| 2009/0144574 A1 | 6/2009 | Tseng et al. | |
| 2009/0262199 A1 | 10/2009 | Miyamoto et al. | |
| 2009/0262200 A1 | 10/2009 | Takabatake et al. | |
| 2009/0262204 A1* | 10/2009 | Pai | G06F 1/1616 348/207.11 |

(Continued)

FOREIGN PATENT DOCUMENTS

JP   2011076267 A   4/2011

OTHER PUBLICATIONS

International Search Report (ISR) dated Aug. 12, 2013 issued in International Application No. PCT/JP2013/066289.

*Primary Examiner* — Timothy J Henn
(74) *Attorney, Agent, or Firm* — Holtz, Holtz & Volek PC

(57) ABSTRACT

An information processing apparatus having first and second cases (13*a*, 13*b*) that are openably/closably connected, and includes an imaging section (6) provided in the second case and opposed to the first case where a read target medium is placed, a detection section (1) which detects that the first and second cases have been closed into a predetermined state by plural types of methods, an acquisition section (1) which acquires a photographed image from the imaging section when the detection section detects that the first and second cases have been closed into the predetermined state by the plural types of methods, a correction section (1) which performs distortion correction processing on the photographed image acquired by the acquisition section, based on a closing state between the first and second cases detected by the detection section, and a storing section (3) which stores the photographed image corrected by the correction section.

5 Claims, 8 Drawing Sheets

(51) Int. Cl.
*G06T 5/00* (2006.01)
*H04N 5/357* (2011.01)
*H04N 1/195* (2006.01)
*G06F 1/16* (2006.01)
*H04N 1/00* (2006.01)

(52) U.S. Cl.
CPC ............ *G06F1/1677* (2013.01); *G06F 1/1686* (2013.01); *G06T 5/006* (2013.01); *G06T 5/50* (2013.01); *H04N 1/00129* (2013.01); *H04N 1/19594* (2013.01); *H04N 5/225* (2013.01); *H04N 5/357* (2013.01); *H04N 2201/0436* (2013.01); *H04N 2201/0438* (2013.01); *H04N 2201/0452* (2013.01)

(56) References Cited

U.S. PATENT DOCUMENTS

| | | | |
|---|---|---|---|
| 2009/0262209 A1* | 10/2009 | Pai | H04N 1/00002 348/222.1 |
| 2012/0001999 A1* | 1/2012 | Schirdewahn | H04N 7/142 348/14.01 |
| 2012/0015671 A1 | 1/2012 | Lada | |
| 2014/0028865 A1* | 1/2014 | Ohtaka | H04N 5/23203 348/211.4 |
| 2014/0063569 A1* | 3/2014 | Hamada | G06K 9/3216 358/479 |
| 2014/0063576 A1* | 3/2014 | Hamada | H04N 1/00087 358/504 |

* cited by examiner

INFORMATION PROCESSING APPARATUS AND COMPUTER-READABLE STORAGE MEDIUM

TECHNICAL FIELD

The present invention relates to an information processing apparatus which includes an imaging section to photograph information described on a read target medium (for example, notebooks or books) and a computer-readable storage medium.

BACKGROUND ART

In general, regarding an information processing apparatus which reads information described on a read target medium (for example, notebooks or books), the information processing apparatus reads image data by scanning the read target medium with a scanner or reads the photographed image by photographing the read target medium with a digital camera.

Conventionally, as a reading technology in which the read target medium is taken on the digital camera, for example, there has been proposed a technology in which, with respect to a notebook computer whose first case and second case are rotatably (openably and closably) attached via a hinge section, when a document is placed on the keytop of the first case, and the second case including an imaging section is held for a predetermined amount of time at a position where the entire keytop can be photographed, the imaging section is operated to start taking a photo of the document (see Patent Literature 1).

However, in the technology disclosed by Patent Literature 1, it is necessary to strictly adjust a predetermined hinge angle between the first case and second case in order to photograph the document placed on the keytop, and the document is photographed at the predetermined hinged angle. However, when the first case and second case are completely closed without carrying out the aforementioned specific operation to hold the second case at the predetermined hinge angle for a predetermined amount of time, the document is not photographed. Moreover, even when the user thinks he or she has performed the specific operation, if the specific operation has not been completely performed, the document is not photographed. Furthermore, the user is required to visually confirm whether the photographed image is clear. In a case where a retake cannot be made, the document cannot be stored.

CITATION LIST

Patent Literature

PTL 1: JP 2011-076267

SUMMARY OF INVENTION

An object of the present invention to provide an information processing apparatus that can clearly photograph and store a read target medium that is a subject to be read, merely by carrying out an operation to close a first case and a second case.

In accordance with one aspect of the present invention, there is provided an information processing apparatus in which a first case and a second case are openably and closably connected, comprising: an imaging section which is provided in the second case and opposed to the first case where a read target medium is placed; a detection section which detects that the first case and the second case have been closed into a predetermined state, by plural types of methods; an acquisition section which acquires a photographed image from the imaging section when the detection section detects that the first case and the second case have been closed into the predetermined state by the plural types of methods; correction section which performs distortion correction processing on the photographed image acquired by the acquisition section, based on a closing state between the first case and the second case detected by the detection section; and a storage section which stores the photographed image corrected by the correction section.

In accordance with another aspect of the present invention, there is provided a non-transitory computer-readable storage medium having stored thereon a program that is executable by a computer, the program being executable by the computer to perform functions comprising: processing for detecting that a first case and a second case have been closed into a predetermined state by plural types of methods, in a case where a read target medium is photographed by an imaging section provided in the second case which is positioned opposite to the first case where the read target medium is placed, and openably and closably connected to the first case; processing for acquiring a photographed image from the imaging section when the first case and the second case are detected to have been closed into the predetermined state by the plural types of methods; processing for performing distortion correction processing on the acquired photographed image, based on a detected closing state between the first case and the second case; and processing for storing the corrected photographed image.

According to the present invention, a read target medium that is a subject to be read can clearly be photographed and readily and securely be stored merely by an operation to close a first case and a second case.

DESCRIPTION OF EMBODIMENTS

Figure 1:
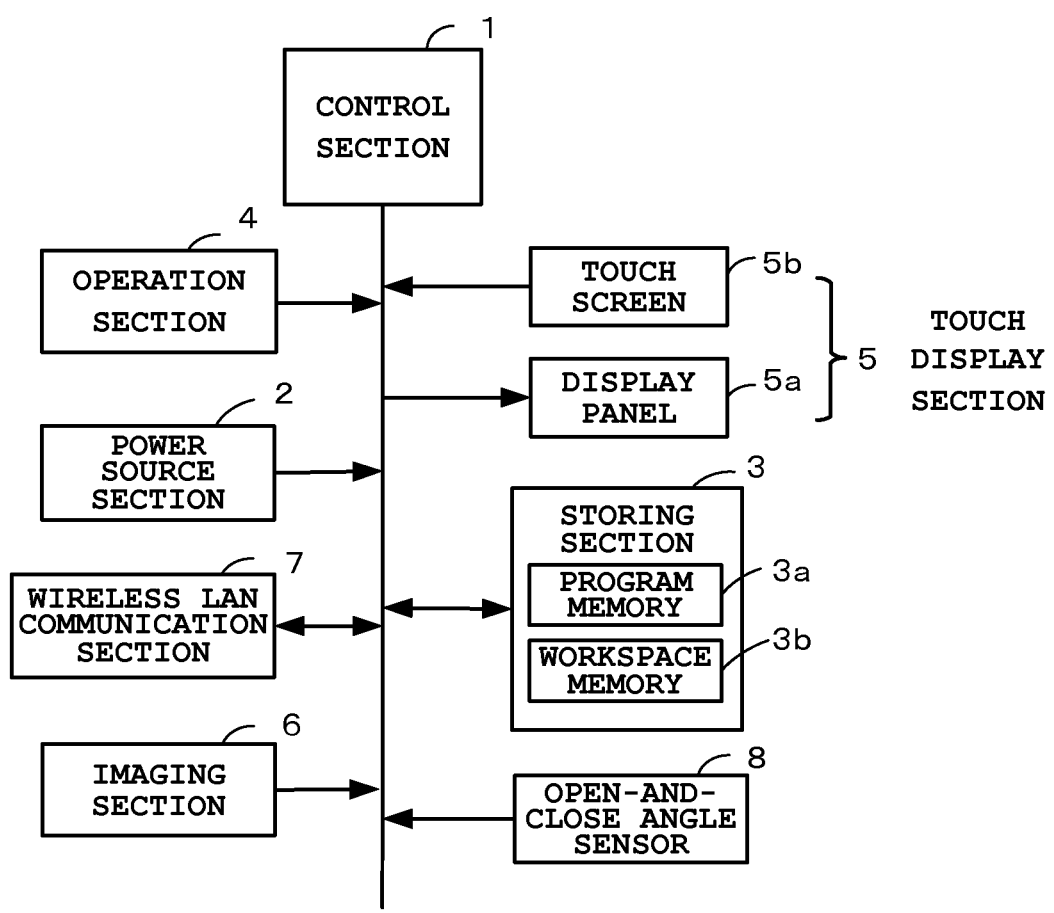
FIG. 1 is a block diagram illustrating basic components of a tablet terminal apparatus 11 with a camera, in which the present invention has been applied as an information processing apparatus.

Hereinafter, the embodiment of the present invention will be described below referring to the FIGS. 1 to 6. This embodiment is exemplified by a case where the present invention is applied as an information processing apparatus to a tablet terminal apparatus having an imaging function (digital camera). FIG. 1 is a block diagram illustrating basic components of the tablet terminal apparatus with a camera. This tablet terminal apparatus is structured such that the entire case thereof is a portable information terminal apparatus having, for example, an A5 size, and includes a later-described image reading function to optically read information (characters and diagrams) described on a read target medium (for example, notes, report paper, and books) placed in close proximity of the tablet terminal apparatus, by taking a photo of the read target medium, in addition to basic functions such as a touch input function and a wireless communication function. In the embodiment of the present invention, the read target medium is represented by a medium on which information to be photographed is described, but is not specified by materials made of paper. That is, in the embodiment of the present invention, the read target medium refers to an object on which information is described. Similarly, in the embodiment of the present invention, the read target medium includes electronic paper in which information can electronically be displayed.

A control section 1 is operated by electric power supplied from a power source section (secondary battery) 2, and controls the entire operation of the tablet terminal apparatus in accordance with various programs stored in a storing section 3, and a CPU (Central Processing Unit) and a memory not illustrated are provided in the control section 1. The storing section 3 is constituted by, for example, a ROM, and a flash memory, and includes a program memory 3a that stores programs and various applications to realize the embodiment of the present invention in accordance with operation procedures illustrated in FIG. 5, and a workspace memory 3b that temporarily stores various information (for example, flags) necessary for the tablet terminal apparatus to be operated. Note that the storing section 3 may include, for example, a detachable, portable memory (storage media) such as an SD (Secure Digital) card and an IC (Integrated Circuit) card, and may include, although not illustrated, a storage area on a predetermined server device side in a case where the connection to the network is established via a communication function.

An operation section 4 includes, although its illustration is omitted, a power key used to turn on/off a power supply, as a push-button type key, and the control section 1 carries out processing in accordance with an input operating signal outputted in response to operated keys on the operation section 4. A touch display section 5 is constituted such that a touch screen 5b is arranged to be layered on a display panel 5a. The display panel 5a is a high definition crystal liquid display having a screen where the aspect ratio differs (for example, 4:3 [width to height]). The touch screen 5b is constituted by a touch screen which detects the position of a finger of a photographer who touches the touch screen 5b and inputs the coordinate data of the position. For example, an electrostatic capacity method or a resistive membrane method is applied to the touch screen 5b, but another method may be applied.

An imaging section 6, which constitutes an image reading function, includes a taking lens, image sensor elements, various sensors, an analog processing section, and a digital processing section, and serves as a digital camera section in which an object image from an optical lens not shown is formed by image sensor elements such as a CCD (Charge Coupled Device) or a CMOS (Complementary Metal Oxide Semiconductor) and whereby the object is photographed in high definition. This imaging section 6 has an automatic focusing function, and can perform, for example, consecutive photographing (high speed photographing) with a frame rate of 15 frames per second (15 fps) during the operation of the image reading function. A wireless LAN (Local Area Network) communication section 7 is a wireless communication module which can perform high-speed, large capacity communication and can be connected to a nearest wireless LAN router (not illustrated) via the Internet. An open-and-close angle sensor 8 is a sensor that detects the open-and-close angle of an openable and closable case described later, and the control section 1 obtains a photographed image from the imaging section 6 in accordance with an open-and-close angle detected by the open-and-close angle sensor 8.

Figure 2:
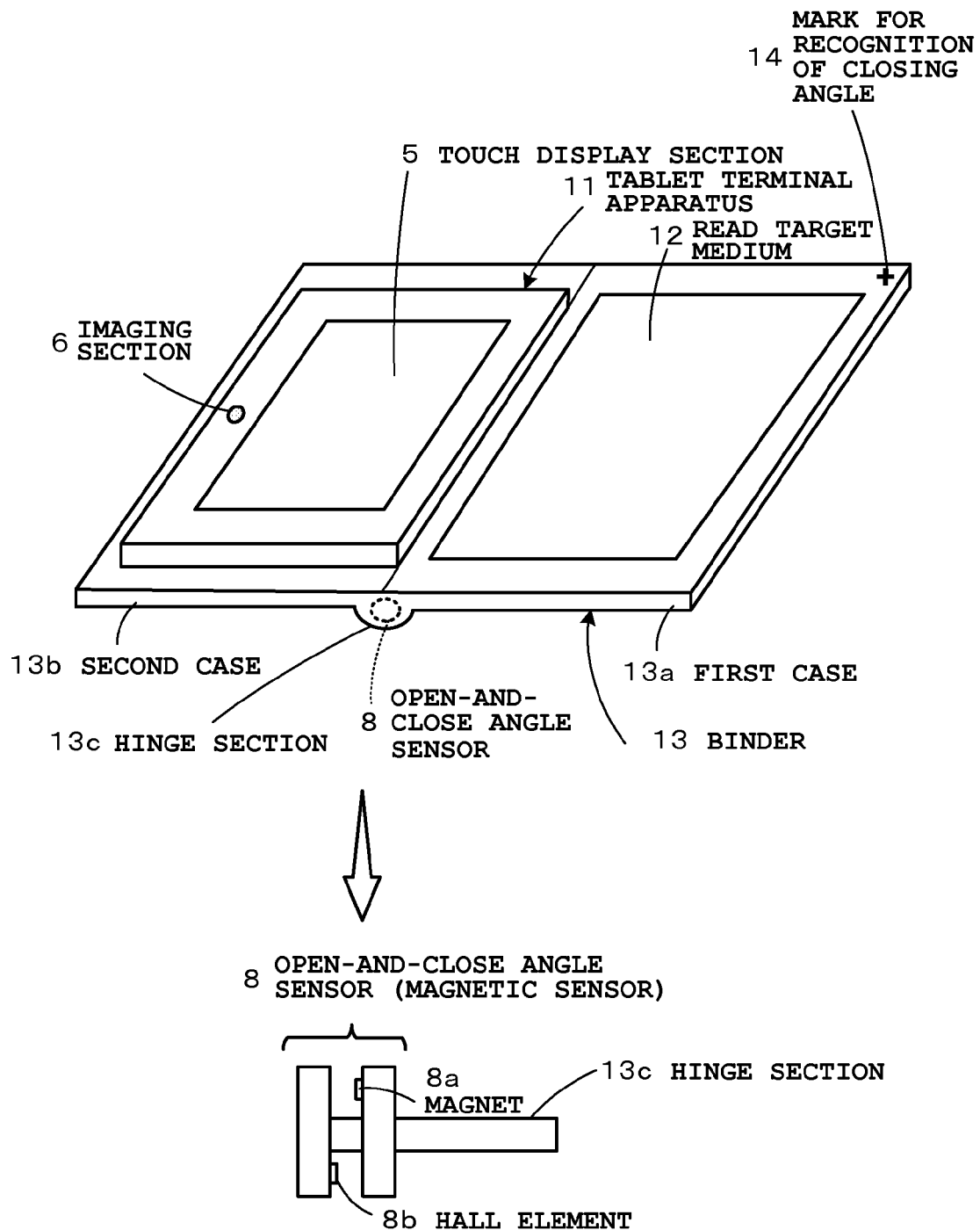
FIG. 2 is an external perspective view illustrating a state where the tablet terminal apparatus 11 with the camera and a read target medium 12 are equipped with a binder 13.

FIG. 2 is an external perspective view illustrating a state where the tablet terminal apparatus 11 with the camera and a read target medium 12 are equipped with a binder 13. The tablet terminal apparatus 11 and the read target medium 12 (for example, notebooks, report paper, and books) are equipped with the binder 13. The binder 13 is constituted such that a first case 13a and a second case 13b are openably and closably attached opposite to each other via a hinge section 13c arranged therebetween. In the example illustrated, the first case 13a is arranged on the right side, and the second case 13b is arranged on the left side. Note that the first case 13a and the second case 13b may be arranged at the inverted position, compared with positional relation illustrated in the diagram. The first case 13a and the second case 13b are made up of a paper member (thick paper) of a thick flat-plate rectangular (identical in shape and size) and openably and closably connected to each other via the hinge section 13c arranged therebetween, in a state where the first case 13a and the second case 13b, both of which are longitudinally extended, are respectively arranged on the left and right sides. That is, the first case 13a and the second case 13b are constituted in such a manner to be openable and closable, centering on the hinge section 13c as a rotation axis.

Also, the first case 13a and the second case 13b are openable and closable, ranging from a state where the angle between the first case 13a and the second case 13b is formed at 180 degrees to a state where the second case 13b fittingly lies on top of the first case 13a (fully closed state). In a state where the binder 13 is opened at 180 degrees, a user can use the tablet terminal apparatus 11 and write characters or depict diagrams on the read target medium 12. Also, when the tablet terminal apparatus 11 and the read target medium 12 are not used, the first case 13a and the second case 13b are closed, thereby fully closing the binder 13.

The whole tablet terminal apparatus 11 is formed in a slim, rectangular parallelepiped, mounted on the second case 13b constituting the binder 13, and arranged in the direction that the tablet terminal apparatus 11 is longitudinally arranged with respect to the longitudinal second case 13b. Also, the read target medium 12 is placed on the other case 13a (first case) constituting the binder 13. The read target medium 12 may be sheet-shaped like a sheet of paper or may be book-shaped like books (state of being bound). Note that positional relation between the tablet terminal apparatus 11 and the read target medium 12 on the binder 13 may be inverted, compared with the description above. Also, the tablet terminal apparatus 11 and the read target medium 12 are detachably mounted on the binder 13, but the way of mounting may be arbitrarily determined. For example, a clasp, and a hook, may be applied.

Thus, in the state where the tablet terminal apparatus 11 is mounted on the second case 13b of the binder 13, the imaging section 6 of the tablet terminal apparatus 11 is arranged to be positioned at one end central portion (surface left end central portion in the example illustrated) on the surface side of the tablet terminal apparatus 11. Also, in the hinge section 13c, the open-and-close angle sensor 8 is arranged. This open-and-close angle sensor 8 is provided in the hinge section 13c that openably and closably connects the first case 13a with the second case 13b, and detects the open-and-close angle between the first case 13a and the second case 13b. For example, the open-and-close angle sensor 8 is constituted by a rotary encoder which outputs two-phase pulses every time the axis (not illustrated) of the hinge section 13c rotates by a certain degree or a magnetic sensor which detects opening and closing with a Hall element or a magneto resistive element. FIG. 2 includes an enlarged perspective view illustrating the structure of the open-and-close angle sensor 8. In this example, the open-and-close angle sensor 8 is constituted by the magnetic sensor in which a magnet 8a is arranged on a disc on the side of the rotation axis constituting the hinge section 13c, and a Hall element 8b is arranged on the side of a disc opposite to the disc on the side of the rotation axis.

Also, a mark 14 serving as an indicator for recognition of the open-and-close angle is provided on a surface corner portion of the first case 13a constituting the binder 13. This mark 14 for recognition of the closing angle is, for example, a cruciform black mark and printed on the top surface of the first case 13a. However, it is not limited to the printing, and a seal with the mark may be affixed. When the open-and-close angle sensor 8 detects a predetermined angle, that is, approximately 70 degrees as an appropriate angle (optimal angle for photographing) at which the read target medium 12 is photographed, the control section 1 obtains a photographed image from the imaging section 6, recognizes the mark 14 by analyzing the photographed image, and judges whether or not the first case 13a and the second case 13b have been closed into a predetermined state based on a result of the recognition of the mark.

Figure 3:
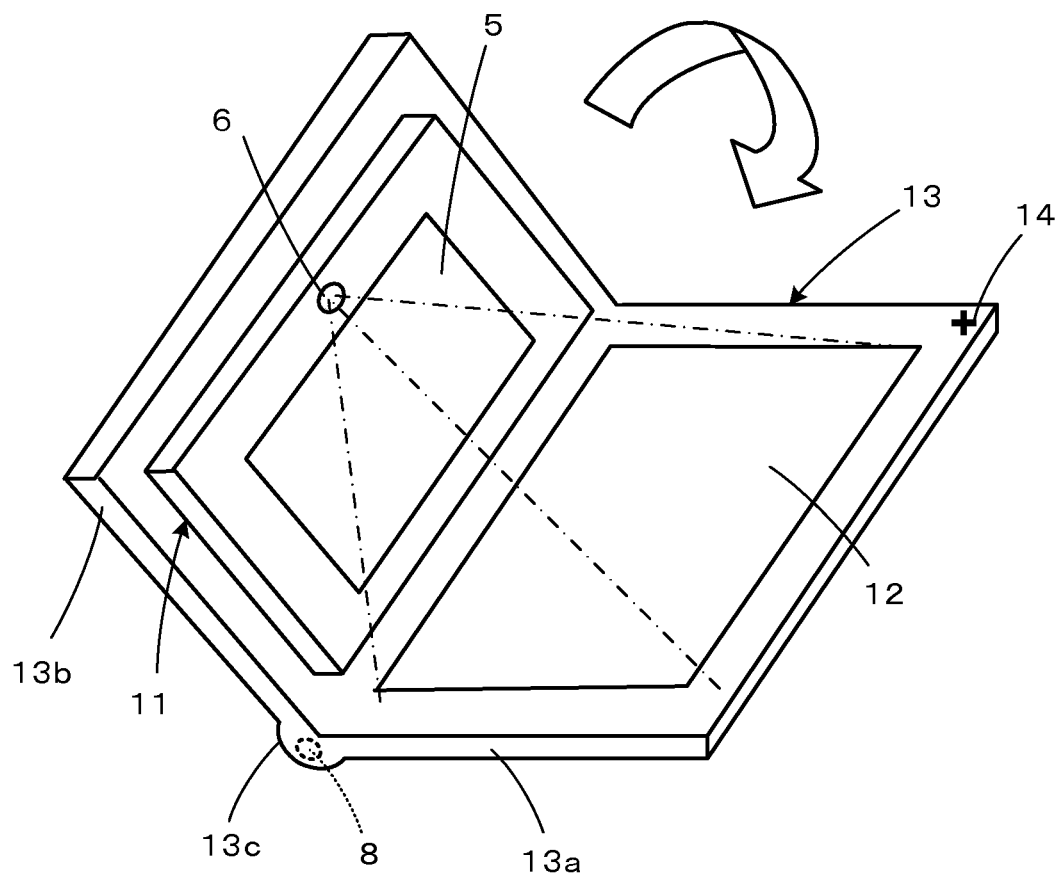
FIG. 3 is a diagram to describe the relation between the read target medium 12 and an image viewing angle of the read target medium 12, which is photographed by an imaging section 6, when a first case 13a and a second case 13b constituting the binder 13 are closed.

FIG. 3 is a diagram to describe the relation between the read target medium 12 and the image viewing angle of the read target medium 12 photographed by the imaging section 6 when the first case 13a and the second case 13b constituting the binder 13 are closed. When the open-and-close angle sensor 8 detects approximately 70 degrees as an angle between the first case 13a and the second case 13b (optimal angle for photographing), the control section 1 obtains a photographed image from the imaging section 6. In this case, the photographing conditions such as focus and exposure have been set in accordance with the optimal angle for photographing (approximately 70 degrees), and the control section 1 obtains an image photographed under these conditions, from the imaging section 6.

Figure 4:
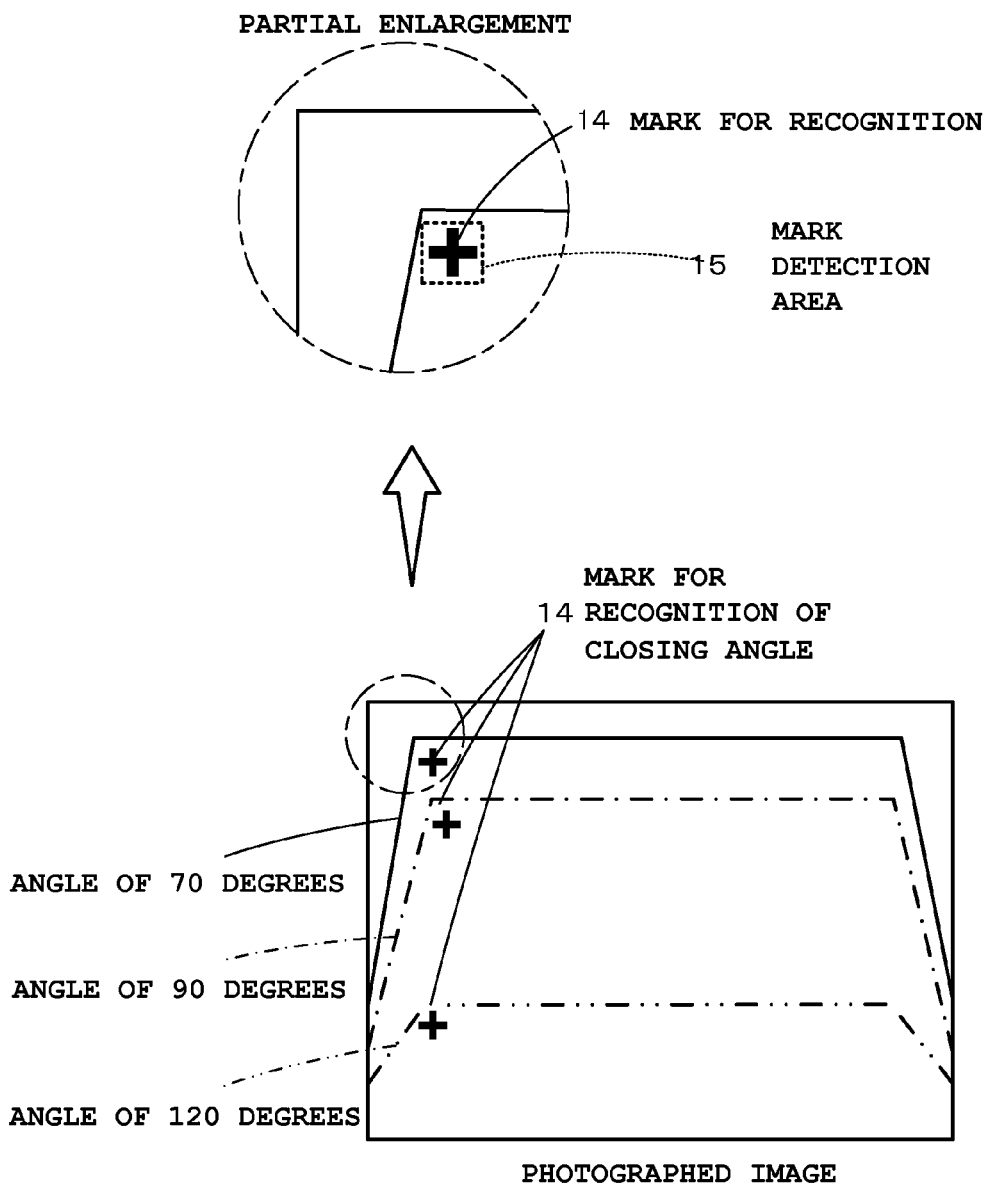
FIG. 4 is a diagram to describe a case where an angle between the first case 13a and the second case 13b is recognized based on the position of a mark for angle recognition in a photographed image.

FIG. 4 is a diagram to describe a state where the photogenic state of the mark 14 for recognition in a photographed image is changed in proportion to an angle between the first case 13a and the second case 13b, and includes a partial enlarged view thereof. In this example, the photogenic state of the mark 14 for recognition of the closing angle when the open-and-close angle is approximately 120 degrees, approximately 90 degrees, or approximately 70 degrees is illustrated. As the binder 13 is gradually closed, the open-and-close angle is changed in the order of approximately 120 degrees, approximately 90 degrees, and approximately 70 degrees, and the position of the mark 14 in the photographed image is changed in proportion to the change of the open-and-close angle and transferred upward in the diagram. The control section 1 recognizes the change of the position of the mark 14 in the photographed image and judges whether or not the first case 13a and the second case 13b have been closed into the predetermined state (closing angle: approximately 70 degrees) based on the position of the mark 14. In this case, a mark detection area 15 is provided at a fixed position in the photographed image (in the example illustrated, the vicinity of a left corner portion). The control section 1 judges whether or not the first case 13a and the second case 13b have been closed into the predetermined state (closing angle: approximately 70 degrees), based on whether or not the mark 14 has been placed within the mark detection area 15.

As such, whether or not the first case 13a and the second case 13b have been closed into the predetermined state (closing angle: approximately 70 degrees) is judged based on a plurality of detection methods of various types. That is, when the open-and-close angle sensor 8 detects approximately 70 degrees as an angle between the first case 13a and the second case 13b (optimal angle for photographing), the control section 1 obtains a photographed image from the imaging section 6, recognizes the photogenic state of the mark 14 for recognition in the photographed image, and judges whether or not the first case 13a and the second case 13b have been closed into the predetermined state (closing angle: approximately 70 degrees), based on whether or not the mark 14 has been placed within the fixed mark detection area 15 in the photographed image.

Next, the operation concept of the tablet terminal apparatus 11 according to the embodiment of the present invention will be described referring to a flowchart illustrated in FIG. 5. Here, each function described in this flowchart is stored in the form of readable program code, and operations according to the program code are sequentially performed. Also, operations according to the program code transmitted via a transmission medium such as a network can be sequentially performed. That is, an operation unique to the present embodiment can be performed by using a program/data externally supplied via not only a recording medium but also a transmission medium.

Figure 5:
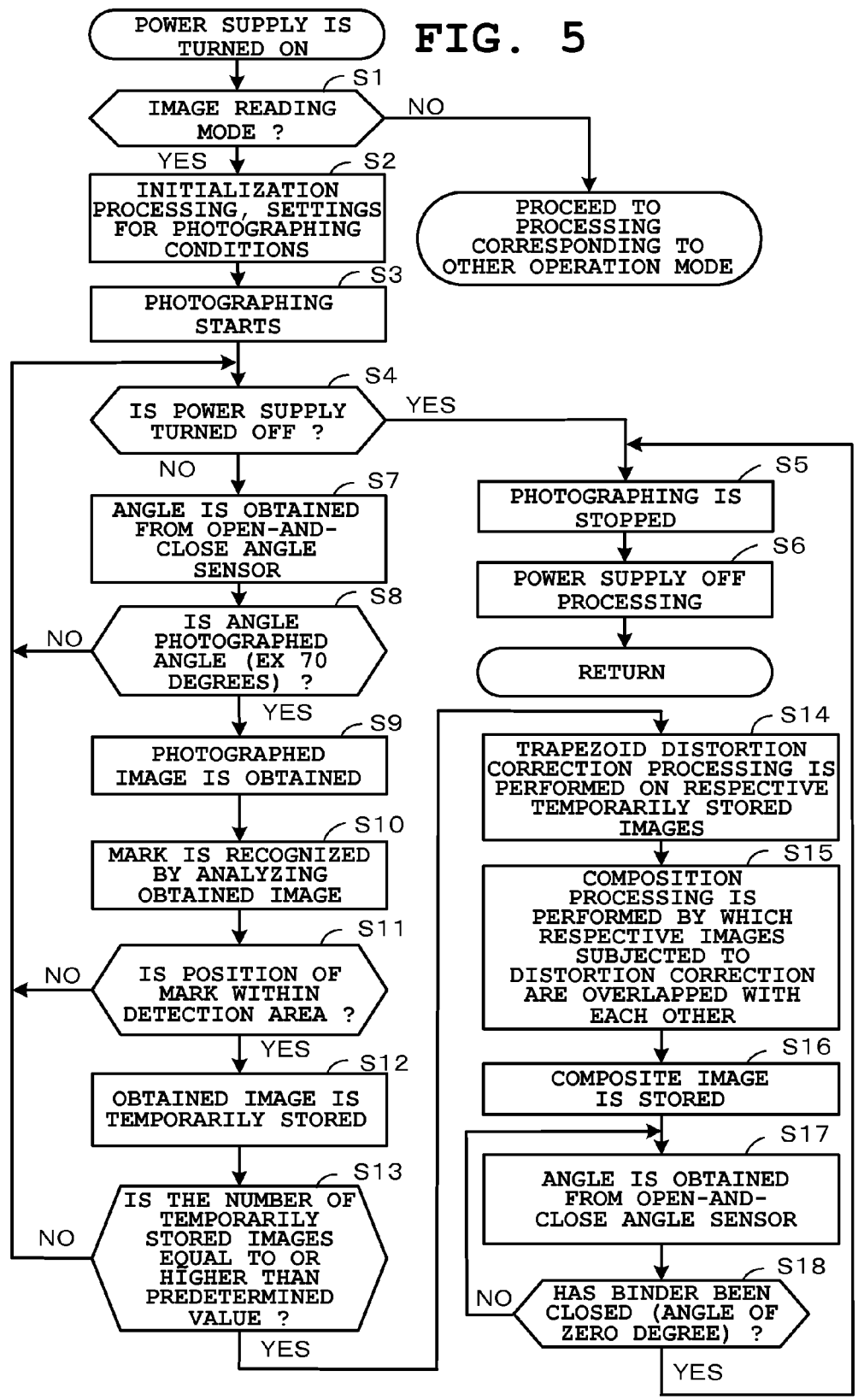
FIG. 5 is a flowchart illustrating the outline of operations including characteristic features according to the embodiment of the present invention, with regards to the entire operation of the tablet terminal apparatus 11.
Figure 6:
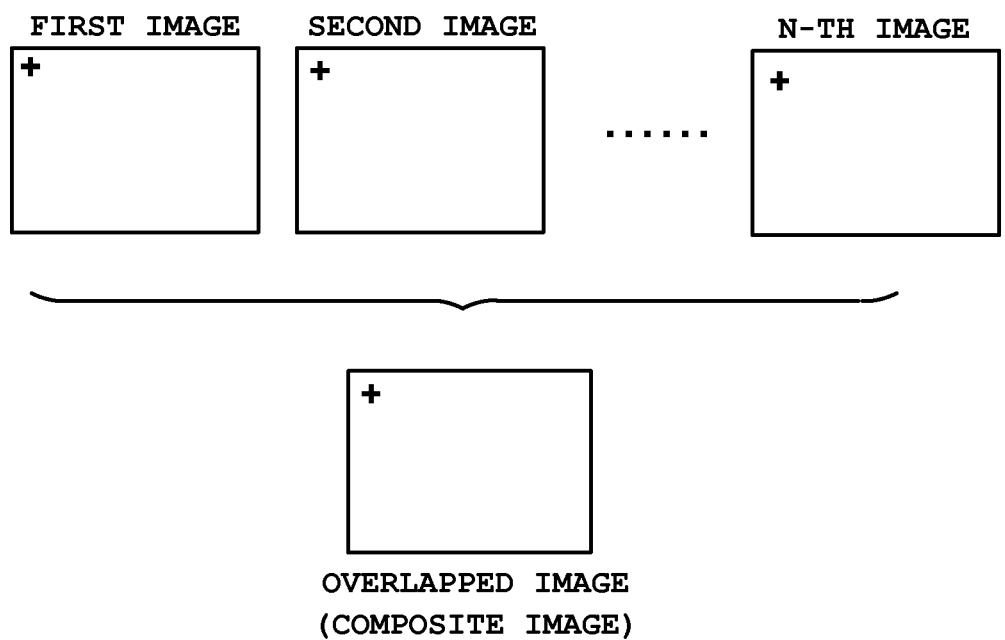
FIG. 6 is a diagram to describe images to be overlapped with reference to a mark for angle recognition, in a case where a plurality of photographed images are overlapped with each other.

FIG. 5 is a flowchart outlining the operation of a characteristic portion of the present embodiment from among all of the operations of the tablet terminal apparatus 11, which is started upon the activation of the power supply. First, the control section 1 judges whether the current mode has been switched to an image reading mode (operation mode) by a user's operation (Step S1). When the current mode has been switched to an operation mode other than the image reading mode (Step S1, NO), the control section 1 proceeds to processing corresponding to this operation mode. When the current mode has been switched to the image reading mode (Step S1, YES), the control section 1 clears the memory and the like as initialization processing, and sets photographing conditions such as focus and exposure in the imaging section 6, in accordance with the optimal angle for photographing (approximately 70 degrees) (Step S2).

Then, after operating the imaging section 6 to start photographing (Step S3), the control section 1 judges whether a power supply OFF operation has been carried out (Step S4). When the power supply OFF operation has been carried out (Step S4, YES), the control section 1 stops the imaging section 6 (Step S5). Then, after performing power supply OFF processing (Step S6), the control section 1 exits the flow in FIG. 5. Conversely, when the power supply OFF operation has not been carried out (Step S4, NO), the control section 1 obtains the open-and-close angle between the first case 13a and the second case 13b from the open-and-close angle sensor 8 (Step S7) and judges whether the open-and-close angle is equal to or lower than approximately 70 degrees (Step S8).

Here, when the open-and-close angle is not equal to or lower than approximately 70 degrees (Step S8, NO), the control section 1 returns to the aforementioned Step S4. When the open-and-close angle is equal to or lower than approximately 70 degrees (Step S8, YES), the control section 1 obtains one frame of photographed image from the imaging section 6 (Step S9) and recognizes the mark 14 for recognition of the closing angle by analyzing the obtained image (Step S10). Then, when the mark 14 in the photographed image is recognized, the control section 1 judges whether or not the first case 13a and the second case 13b have been closed into the predetermined state, based on whether or not the position of the mark 14 is within the mark detection area 15 (Step S11).

Here, when the open-and-close angle detected by the open-and-close angle sensor 8 is, for example, approximately 125 degrees or approximately 90 degrees as illustrated in FIG. 4, the control section 1 judges that the first case 13a and the second case 13b have not been closed into the predetermined state because the position of the mark 14 is far out of the mark detection area 15 (Step S11, NO), and therefore returns to the aforementioned Step S4. When the open-and-close angle is equal to or lower than approximately 70 degrees (Step S11, YES), the control section 1 judges that the first case 13a and the second case 13b have been closed into the predetermined state because the position of the mark 14 is within the mark detection area 15 (Step S11, YES).

Thus, when it is detected that the first case 13a and the second case 13b have been closed into the predetermined state based on a plurality of detection methods of various types (Step S11, YES), the control section 1 temporarily stores the obtained image in the workspace memory 3b as an candidate image to be stored (Step S12). Subsequently, the control section 1 counts the number of temporarily stored images, and judges whether the number of the images has reached a predetermined value (for example, three images) (Step S13). Then, until the number of temporarily stored images reaches the predetermined value, the control section 1 repeatedly returns to the aforementioned Step S4 to perform the aforementioned operations (Steps S4 to S13). Note that the number of images is not limited to three and may be arbitrarily set based on the user's operation.

When the number of temporarily stored images reaches the predetermined value (Step S13, YES), the control section 1 sequentially reads out each of the temporarily stored images, and performs processing for correcting trapezoid distortion for each image (Step S14), In this case, the processing for correcting trapezoid distortion is carried out on the basis of the open-and-close angle which is approximately 70 degrees. Note that, in a case where open-and-close angles when the plurality of temporarily stored images are obtained are different from each other, trapezoid distortion correction corresponding to each open-and-close angle may be carried out. That is, the parameter of the distortion correction is changed based on an open-and-close angle at the time of image acquisition, and trapezoid distortion correction corresponding to the open-and-close angle is carried out. As a result, when the correction processing is performed for all the images, the control section 1 performs composition processing by which the images whose distortion have been corrected are overlapped with each other (Step S15). In this case, each mark 14 provided in each image, such as the first image, the second image, and the n-th image illustrated in FIG. 6, serves as a reference point for alignment, by which the images are overlapped with each other by the precise alignment.

Then, the control section 1 stores the composite image created by the images being overlapped with each other in the SD card of the storing section 3 (Step S16). Subsequently, the control section 1 obtains an open-and-close angle from the open-and-close angle sensor 8 (Step S17) and judges whether the binder 13 has been closed, or in other words, the open-and-close angle is approximately zero degree (Step S18). When the binder 13 has not been closed (Step S18, NO), the control section 1 returns to the aforementioned Step S17, and repeatedly performs the operations of Steps S17 and S18 until the binder 13 is closed. Conversely, when the binder 13 has been closed (Step S18, YES), the control section 1 stops the imaging section 6 (Step S5), and after performing power supply OFF processing (Step S6), exits the flow in FIG. 5.

As described above, in the tablet terminal apparatus 11 according to the embodiment of the present invention, the read target medium 12 placed on the first case 13a, which is a subject to be read, is photographed by the imaging section 6 provided in the second case 13b and, when it is detected that the first case 13a and the second case 13b have been closed into a predetermined state based on the plurality of methods of various types, the photographed image obtained from the imaging section 6 is subjected to distortion correction and stored. Therefore, the read target medium 12, which is a subject to be read, can be clearly photographed and stored simply by an operation to close the first case 13a and the second case 13b, whereby simple and secure storage can be made.

Also, in the hinge section 13c that openably and closably connects the first case 13a and the second case 13b, the open-and-close angle sensor 8 is provided. As a result, the closing state can be reliably detected.

Moreover, the control section 1 recognizes the mark 14 on an image photographed by the imaging section 6, by analyzing the photographed image, and detects the closing state based on a result of the recognition. As a result, the closing state can be detected by image processing.

Furthermore, when it is detected that the first case 13a and the second case 13b have been closed into the predetermined state, the distortion correction processing is performed on a plurality of images photographed by the imaging section 6, and a composite image created by the plurality of corrected images being overlapped with each other is stored. Therefore, more clear images can be photographed and stored. That is, by the plurality of images being overlapped with each other, noise can be reduced and image brightness can be increased. Accordingly, a shutter speed can be increased at the time of photographing and image blurring can be avoided. Also, gain is changed at the time of photographing for each frame, and the photographed images are overlapped with each other. Therefore, wide dynamic range images can be photographed. As a result, more clear images can be photographed and stored.

Figure 7:
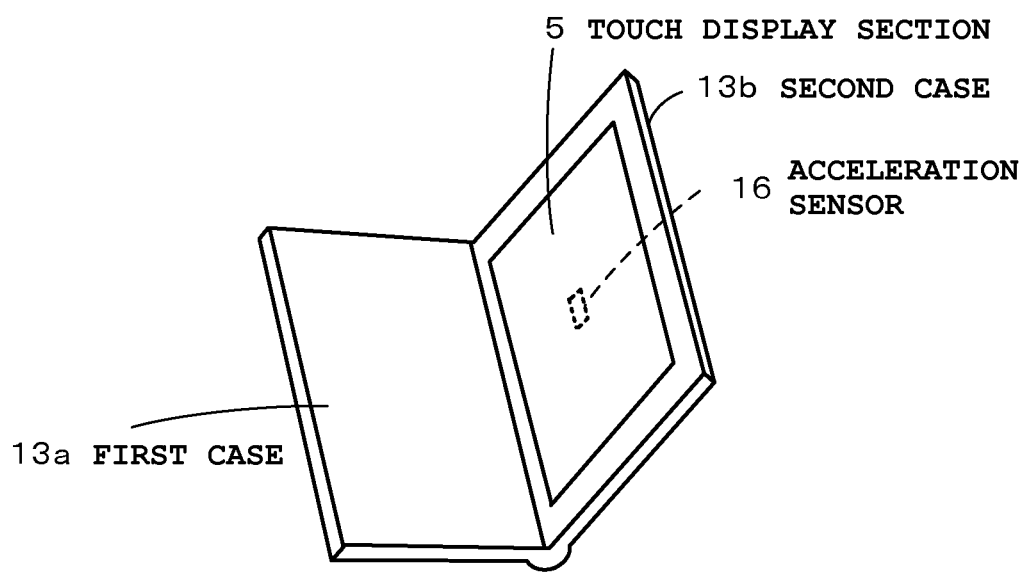
FIG. 7 is a diagram for describing a variation example of the embodiment of the present invention, in which an acceleration sensor 16 has been provided in the second case 13b.

In the embodiment of the present invention described above, the open-and-close angle is detected by the open-and-close angle sensor (for example, magnetic sensor) 8. However, a configuration may be adopted in which an acceleration sensor 16 is provided in the second case 13b so as to detect the closing state between the first case 13a and the second case 13b, as illustrated in FIG. 7. That is, a configuration may be adopted in which, by the acceleration sensor 16, the direction of gravity is detected, and the closing state is detected based on a relative orientation (angle) between the first case 13a and the second case 13b. This is effective when the open-andclose angle sensor 8 cannot be mounted on the hinge section 13c due to the restriction of on-board installation.

Figure 8:
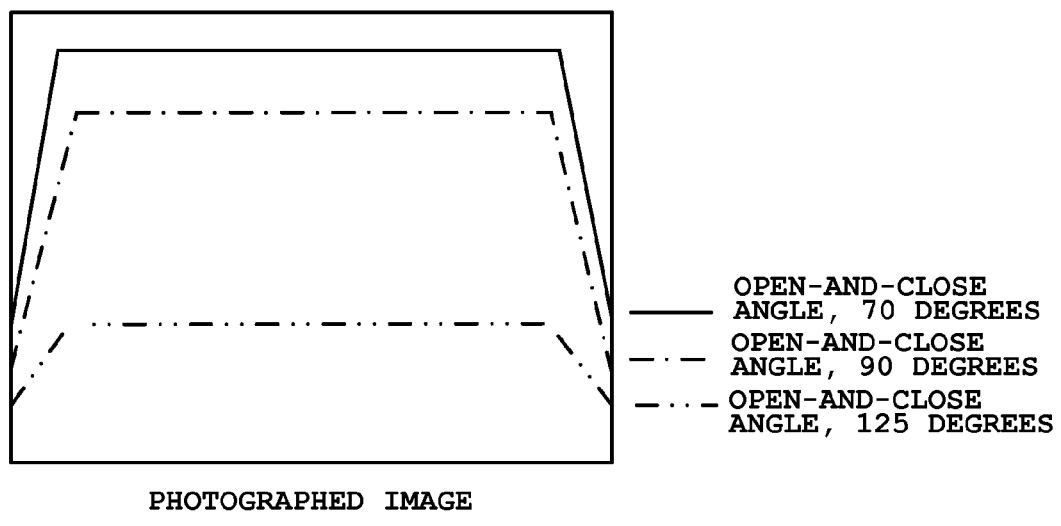
FIG. 8 is a diagram for describing a variation example of the embodiment of the present invention, in which a case is described where an angle between the first case 13a and the second case 13b is detected by analyzing a photographed image.

Also, in the embodiment of the present invention described above, the closing state is detected by recognizing the mark 14. However, a configuration may be adopted in which the closing state is detected by analyzing a photographed image and recognizing an indicator other than the mark 14. FIG. 8 is a diagram to describe the configuration in which the closing state is detected by recognizing an indicator other than the mark 14. The control section 1 analyzes a photographed image, and thereby recognizes the position of the end portion of the first case 13a, as the way of veering of the end portion of the first case 13a when the end portion comes off the line of the viewing angle of the imaging section 6. Then, the control section 1 recognizes the closing state between the first case 13a and the second case 13b based on whether or not the way of veering of the end portion (the position of the end portion) is a predetermined way of veering (a predetermined position).

This example is a diagram illustrating a state where the photogenic state of the outer line of the first case 13a is changed in proportion to the open-and-close angle between the first case 13a and the second case 13b. In the example, the solid line illustrating the outer line of the first case 13a represents the case where the open-and-close angle is approximately 70 degrees, the dashed-dotted line represents the case where the open-and-close angle is approximately 90 degrees, and the dashed doubled-dotted line represents the case where the open-and-close angle is approximately 125 degrees. As described in this example, the way of veering of the end portion of the first case 13a when the end portion comes off the viewing angle of the imaging section 6, that is, the position where the end portion of the first case 13a intersects the line of the viewing angle is changed in proportion to the open-and-close angle. In this case, the outer line of the first case 13a comes closer to the central portion in the longitudinal direction of the photographed image, in the order of approximately 70 degrees, approximately 90 degrees, and approximately 125 degrees with regards to the open-and-close angle, so that the open-and-close angle between the first case 13a and the second case 13b can be detected based on the position.

Moreover, in the aforementioned embodiment, the present invention is applied to the tablet terminal apparatus 11 as an information processing apparatus. However, the present invention is not limited thereto. The present invention may be applied to personal computers with a camera function, PDA (personal, portable information communication equipment), digital cameras, music players, or the like, or, as a matter of course, may be a digital camera itself.

Furthermore, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

This application is based upon and claims the benefit of priority from Japanese patent application No. P2012-141036, filed on Jun. 22, 2012, the disclosure of which is incorporated herein in its entirety by reference.

While the present invention has been described with reference to the preferred embodiments, it is intended that the invention be not limited by any of the details of the description therein but includes all the embodiments which fall within the scope of the appended claims.

The invention claimed is:

1. An information processing apparatus in which a first case and a second case are openably and closably connected, comprising:
    an imaging device which is provided in the second case and opposed to the first case which is configured to have a read target medium placed thereon; and
    a controller, which comprises a processor and a program memory storing program code which is read by the processor such that the controller is configured to:
    detect that the first case and the second case have been closed into a predetermined open-and-close angle;
    control the imaging device to consecutively acquire a plurality of photographed images when it is detected that the first case and the second case have been closed into the predetermined open-and-close angle;
    perform distortion correction processing on each of the plurality of photographed images;
    perform composition processing by which the photographed images on which the distortion correction processing is performed are overlapped with each other, to obtain a composite image; and
    store the composite image in a memory.

2. The information processing apparatus according to claim 1, further comprising a sensor provided in a hinge section which openably and closably connects the first case with the second case, wherein the controller is configured to detect an open-and-close angle between the first case and the second case based on an output of the sensor.

3. The information processing apparatus according to claim 1, wherein the controller is configured to analyze images obtained by the imaging device and recognize a predetermined indicator in the images, and to detect the open-and-close angle between the first case and the second case based on a recognition result.

4. The information processing apparatus according to claim 1, further comprising a sensor provided in the second case, wherein the controller is configured to detect the open-and-close angle between the first case and the second case based on a relative orientation between the first case and the second case which is determined using an output from the sensor.

5. A non-transitory computer-readable storage medium having stored thereon a program that is executable by a computer, the program being executable by the computer to perform functions comprising:
    detecting that a first case and a second case have been closed into a predetermined open-and-close angle, in a case in which a read target medium is photographed by an imaging device provided in the second case which is positioned opposite to the first case where the read target medium is placed, the first case and the second case being openably and closably connected;
    consecutively acquiring a plurality of photographed images photographed by the imaging device when the first case and the second case are detected to have been closed into the predetermined open-and-close angle;
    performing distortion correction processing on each of the plurality of acquired photographed images;
    performing composition processing by which the photographed images on which the distortion correction processing is performed are overlapped with each other, to obtain a composite image; and
    storing the obtained composite image.

* * * * *